(12) United States Patent
Datta et al.

(10) Patent No.: US 7,900,086 B2
(45) Date of Patent: Mar. 1, 2011

(54) ACCELERATING TEST, DEBUG AND FAILURE ANALYSIS OF A MULTIPROCESSOR DEVICE

(75) Inventors: Ramyanshu Datta, Austin, TX (US); Matthew E. Fernsler, Round Rock, TX (US); Harm P. Hofstee, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/129,030

(22) Filed: May 29, 2008

(65) Prior Publication Data

US 2008/0229166 A1   Sep. 18, 2008

Related U.S. Application Data

(63) Continuation of application No. 11/421,518, filed on Jun. 1, 2006, now abandoned.

(51) Int. Cl.
*G06F 11/00* (2006.01)
(52) U.S. Cl. ...................................................... 714/11
(58) Field of Classification Search .................. 714/30, 714/11, 56
See application file for complete search history.

(56) References Cited

U.S. PATENT DOCUMENTS

| | | | |
|---|---|---|---|
| 4,453,215 A | | 6/1984 | Reid |
| 4,622,667 A | | 11/1986 | Yount et al. |
| 4,967,347 A | * | 10/1990 | Smith et al. ............... 714/12 |
| 5,732,209 A | * | 3/1998 | Vigil et al. ............... 714/30 |
| 5,748,872 A | * | 5/1998 | Norman .................... 714/11 |
| 5,838,900 A | | 11/1998 | Horvath et al. |
| 2003/0034541 A1 | | 2/2003 | Essick et al. |
| 2003/0179631 A1 | | 9/2003 | Koob et al. |
| 2004/0088594 A1 | | 5/2004 | Canagasaby et al. |
| 2004/0193985 A1 | | 9/2004 | Bhora et al. |
| 2006/0005072 A1 | * | 1/2006 | Philippe Conti et al. ....... 714/5 |

OTHER PUBLICATIONS

Prasad, Vinod B., "Fault tolerant digital systems", IEEE Potentials, vol. 8, No. 1, Feb. 1989, pp. 17-21.

* cited by examiner

*Primary Examiner*—Scott T Baderman
*Assistant Examiner*—Yair Leibovich
(74) *Attorney, Agent, or Firm*—Stephen J. Walder, Jr.; Matthew B. Talpis

(57) ABSTRACT

A mechanism for accelerating test, debug and failure analysis of a multiprocessor device is provided. With the mechanism, on-chip trace logic is utilized to receive internal signals from logic provided in modules of the multiprocessor device. The modules are preferably copies of one another such that, given the same inputs, each module should operate in the same manner and generate the same output as long as the modules are operating properly. The modules are provided with the same inputs and the internal signals of the modules are traced using an on-chip trace bus and on-chip trace logic analyzer to perform the trace. The internal signals from one module are compared against another module so as to determine if there is any discrepancy which would indicate a fault. Additional pairs of modules may be compared to pinpoint a faulty module that is the source of the fault.

20 Claims, 5 Drawing Sheets

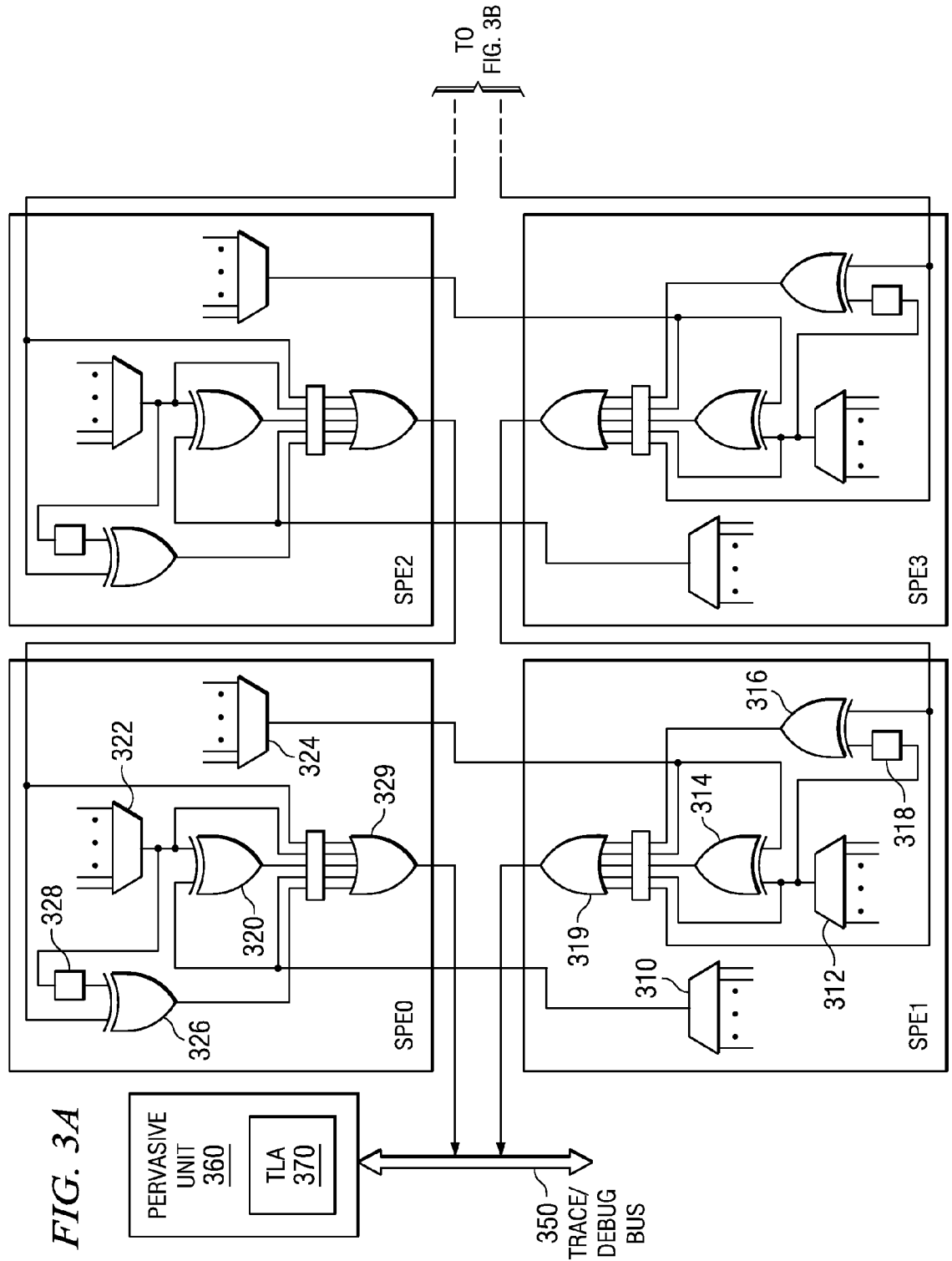

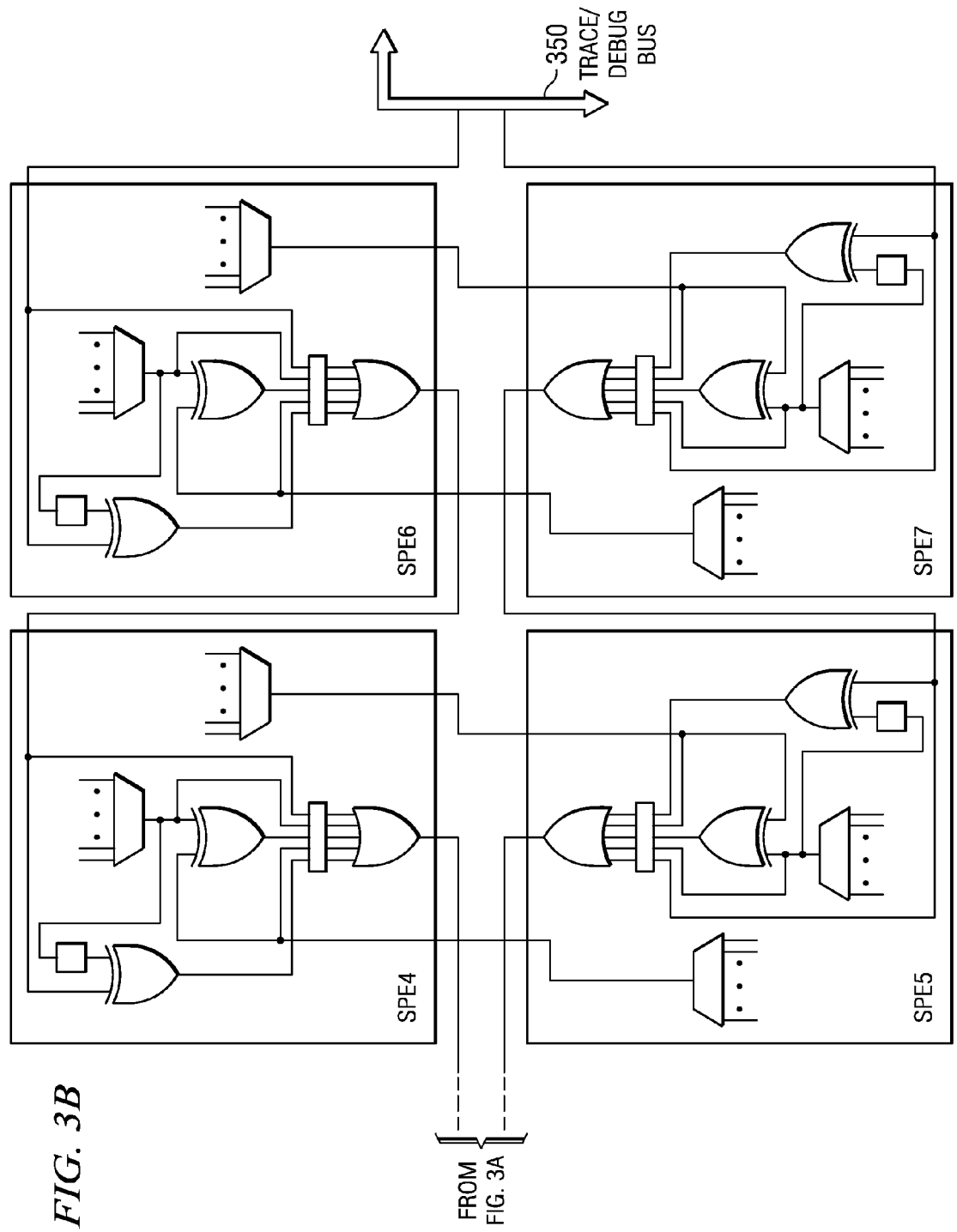

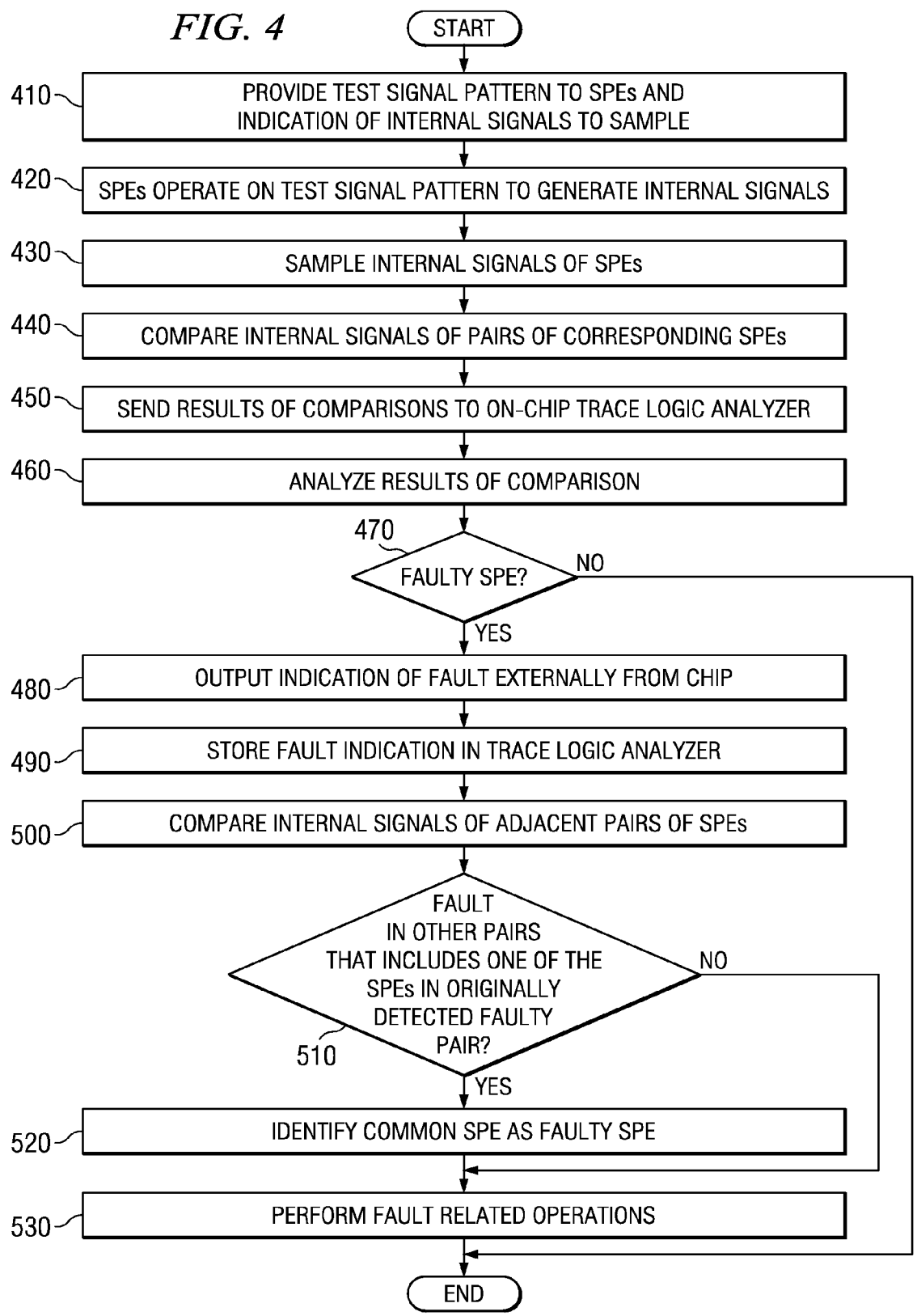

ACCELERATING TEST, DEBUG AND FAILURE ANALYSIS OF A MULTIPROCESSOR DEVICE

This application is a continuation of application Ser. No. 11/421,518, filed Jun. 1, 2006, status pending.

BACKGROUND

1. Technical Field

The present application relates generally to an improved data processing system and method. More specifically, the present application is directed to an apparatus and method for accelerating test, debug and failure analysis of a multiprocessor device.

2. Description of Related Art

When manufacturing integrated circuit chips, it is important to be able to test the operation of the modules, e.g., processors, on the integrated circuit chips in order to ensure their proper operation. The time required to test such modules significantly adds to the total cost of manufacturing the integrated circuit chip. Thus, if it is possible to improve upon the test time, the cost of manufacturing integrated circuit chips may be reduced. Moreover, efficient debug and failure analysis of such modules helps in reducing the total time to market as well as increases the yield, resulting in overall reduction in cost of manufacturing the integrated circuit chip.

The usual manner of testing a module on an integrated circuit chip is the application of signal patterns using an external tester and scan chains provided on the integrated circuit chip. Alternatively, an internal built-in-self-test (BIST) engine and scan chains may be used. While these test methods are necessary for exhaustive testing of the integrated circuit device, they are time consuming processes that require external test equipment to extract test results from the integrated circuit chip and perform the necessary analysis for determining if the integrated circuit chip is operating properly.

One approach to detecting faults in modules of an integrated circuit chip involves comparing a module on an integrated circuit chip with a copy of the module. Such an approach is referred to as fault detection by duplication and is considered to be conceptually the most simple fault detection technique for integrated circuit chip modules. An example of fault detection by duplication is described in Prasad, "Fault Tolerant Digital Systems," IEEE Potentials, vol. 8, no. 1, pp. 17-21, February 1989, which is hereby incorporated by reference.

There are significant drawbacks to known fault detection by duplication mechanisms. For example, in addition to the overhead of having to provide a duplicate module, fault detection by duplication requires an external comparator (external to the integrated circuit chip) for comparing the outputs of the module under test and the duplicate module. In addition, such fault detection is not able to monitor important internal signals for comparison, making fault detection much more time consuming. Thus, it would be beneficial to eliminate the need for external test equipment that provides an external comparator and provide a mechanism that permits monitoring of important internal signals.

SUMMARY

The illustrative embodiments provide an apparatus and method for accelerating test, debug and failure analysis of a multiprocessor integrated circuit chip. With the apparatus and method of the illustrative embodiments, on-chip trace logic is utilized to receive internal signals from logic provided in modules of the multiprocessor integrated circuit chip. The modules are preferably copies of one another such that each of the modules, aside from manufacturing discrepancies, should be exactly the same with regard to configuration. Similarly, given the same inputs, each module should operate in the same manner and generate the same output as long as the modules are operating properly.

For testing purposes, the modules are provided with the same inputs and the outputs of the modules are traced using a trace bus and trace logic analyzer (TLA) to perform the trace. The internal signals from the modules that are to be output by the module onto a trace bus are merged onto the trace bus. The trace bus then transmits the signals to a TLA. The TLA is capable of performing selected logic functions on the signals that come into it from the trace bus. For example, the TLA may determine if the integrated circuit chip is faulty. The TLA, with appropriate logic being provided, or external equipment may determine which modules on the integrated circuit chip are faulty, cause hot-swapping of a redundant module for a failed or faulty module, and/or other fault related operations, based on the determination of whether a fault has occurred or not.

With the mechanisms of the illustrative embodiments, identical test patterns are applied to all of the modules and corresponding signals of any two modules are compared. The signals that are being compared are internal signals to the modules. The comparison may be performed using one or more logic gates provided in the logic of the modules. In one illustrative embodiment, the comparison is performed using XOR gates as comparators. These XOR gates may be provided before the OR gates that are used to merge the signals onto the trace bus. Control blocks may also be provided to synchronize and/or enable and disable signals to be compared.

The illustrative embodiments take advantage of the fact that corresponding signals of any two modules should have the same value when the same stimulus, i.e. input, is applied to both modules. For purposes of the testing of the illustrative embodiments, two modules are compared at a time. Thus, a first module's output signals may be compared to a second module's output signals to determine if there is a discrepancy. If there is a discrepancy, then a faulty module may be present. If there is no discrepancy, then it can be determined that the modules are operating properly for the given set of inputs. In this way, testing of the modules on the integrated circuit chip may be performed using on-chip test logic and an on-chip debug bus.

In order to perform debug and failure analysis, a second pair of modules may be compared in a similar way. This second pair of modules may include one of the modules from the first pair. The first pair of modules may be, for example, across from each other with regard to the trace bus while the second pair of modules may be adjacent modules on the same side of the trace bus.

For example, the first module's output signals and a third module's output signals may be compared to determine if there is any discrepancy. If a discrepancy is again detected, it may be reasonably determined that the first module is the source of the fault since both comparisons included the first module and both comparisons resulted in a discrepancy being detected.

The result signals of comparisons, which may be the outputs of the XOR gates, for example, between any two modules on the integrated circuit chip are output, such as via the OR gates, to a debug bus. The debug bus provides the output signals to the TLA, which may perform the analysis described above to determine if the integrated circuit chip has a fault. Based on this analysis, the TLA may provide an output signal off-chip to external testing equipment for indicating whether the chip is faulty or not. Based on this information, the external testing equipment may perform analysis to determine which module is the faulty module, for example. Alternatively, given the appropriate on-chip logic, the TLA may perform such identification of the faulty module itself. Moreover, given the appropriate logic, the TLA may perform operations for performing hot-swapping of a redundant module, if any, to replace the identified faulty module.

In one illustrative embodiment, the integrated circuit chip is a multiprocessor system-on-a-chip (SoC). In such a multiprocessor SoC, the modules may be the processors themselves. Thus, the mechanisms of the illustrative embodiments may be used to identify faulty processors in a multiprocessor SoC so as to indicate the chip to be faulty and/or to perform hot-swapping of a redundant processor in place of the faulty processor.

In one illustrative embodiment, the multiprocessor SoC may be a heterogeneous multiprocessor SoC, such as the Cell Broadband Engine (CBE), also known as the Broadband Processor Architecture, available from International Business Machines, Inc. of Armonk, N.Y. In such a heterogeneous multiprocessor SoC, a control processor is provided along with a plurality of co-processors which may operate using a different instruction set from that of the control processor. The mechanisms of the illustrative embodiments may make use of an existing debug bus provided in the heterogeneous multiprocessor SoC for performing the transfer of signals from the co-processors to an existing TLA in the heterogeneous multiprocessor SoC. Logic may be provided in each of the co-processors for facilitating the comparisons between co-processors as the modules described above. In this way, faulty co-processors may be identified using on-chip internal signal tracing and comparison between duplicate co-processors.

In one illustrative embodiment, a method, in an integrated circuit device, is provided for identifying a faulty module of the integrated circuit device. The method may comprise applying an input test pattern to a plurality of modules of the integrated circuit device. The plurality of modules are preferably copies of one another within a manufacturing tolerance. Internal signals of at least two modules in the plurality of modules may be sampled, within the integrated circuit device. The sampled internal signals of the at least two modules may be compared, within the integrated circuit device, to detect if there is any discrepancy between the internal signals. The integrated circuit device may then be identified as faulty if a discrepancy between the internal signals is detected by the comparison.

The sampling of the internal signals may comprise sampling the internal signals using internal signal sampling logic built into each of the at least two modules in the plurality of modules. The comparing of the internal signals of the at least two modules may comprise using comparison logic built into at least one of the at least two modules in the plurality of modules.

The identifying of the integrated circuit device as faulty may comprise providing results of the comparison to a trace/debug bus of the integrated circuit device. The results of the comparison may be transferred to a trace logic analyzer provided on the integrated circuit device via the trace/debug bus. The trace logic analyzer may analyze the results of the comparison to determine if the integrated circuit device is faulty.

Comparing the internal signals of the at least two modules may comprise comparing, in a first comparison, one or more internal signals of a first module with one or more internal signals of a second module, and comparing, in a second comparison, the one or more internal signals of the first module with one or more internal signals of a third module. The first module and second module may be opposite each other with respect to a bus of the integrated circuit device. The first module and third module may be adjacent to each other with respect to the bus of the integrated circuit device.

The method may further comprise identifying which module in the plurality of modules on the integrated circuit device is faulty based on results of the first comparison and second comparison. For example, if results of the first comparison indicate a faulty module and results of the second comparison indicate a faulty module, then the first module is identified as the faulty module. The method may further comprise performing a hot-swap operation to swap a spare module for the faulty module identified by the results of the first comparison and second comparison.

The plurality of modules may be processors and the integrated circuit device may be a multiprocessor integrated circuit device. The multiprocessor integrated circuit device may be a heterogeneous multiprocessor system-on-a-chip having a control processor and a plurality of co-processors. The plurality of co-processors may constitute the plurality of modules.

In a further illustrative embodiment, an apparatus is provided that comprises a plurality of modules, internal sampling logic providing in each of the plurality of modules, and comparison logic provided in each of the plurality of modules. The plurality of modules are preferably copies of one another within a manufacturing tolerance. An input test pattern may be applied to the plurality of modules of the integrated circuit device and the internal signal sampling logic of at least two modules in the plurality of modules may sample internal signals of the at least two modules. The comparison logic of at least one module of the at least two modules may compare the internal signals of the at least two modules to detect if there is any discrepancy between the internal signals. The integrated circuit device may be identified as faulty if a discrepancy between the internal signals is detected by the comparison logic of the at least one module. The comparison logic of a first module may comprise an exclusive OR gate that compares an output signal of an adjacent second module with an internal signal of the first module.

The apparatus may further comprise a trace/debug bus coupled to the plurality of modules and a trace logic analyzer coupled to the trace/debug bus. The integrated circuit device may be identified as faulty by providing results of the comparison to the trace/debug bus, transferring the results of the comparison to the trace logic analyzer via the trace/debug bus, and analyzing, in the trace logic analyzer, the results of the comparison to determine if the integrated circuit device is faulty.

The internal signals of the at least two modules may be compared by comparing, in a first comparison, one or more internal signals of a first module with one or more internal signals of a second module, and comparing, in a second comparison, the one or more internal signals of the first module with one or more internal signals of a third module. The first module and second module may be opposite each other with respect to a bus of the apparatus. The first module and third module may be adjacent to each other with respect to the bus of the apparatus.

One of a trace logic analyzer or external testing equipment may identify which module in the plurality of modules of the apparatus is faulty based on results of the first comparison and second comparison. For example, if results of the first comparison indicate a faulty module and results of the second comparison indicate a faulty module, then the first module may be identified as the faulty module. One of the trace logic analyzer or the external testing equipment may initiate a hot-swap operation to swap a spare module for the faulty module identified by the results of the first comparison and second comparison.

The plurality of modules may be processors and the apparatus may be a multiprocessor integrated circuit device. The multiprocessor integrated circuit device may be a heterogeneous multiprocessor system-on-a-chip having a control processor and a plurality of co-processors. The plurality of co-processors may constitute the plurality of modules.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A and 3B provide an exemplary circuit diagram in accordance with one illustrative embodiment; and FIG. 4 is a flowchart outlining an exemplary operation for performing failure analysis of a module on a multiprocessor integrated circuit chip in accordance with one illustrative embodiment.

DETAILED DESCRIPTION OF THE PREFERRED EMBODIMENTS

The illustrative embodiments provide an apparatus and method for accelerating test, debug, and failure analysis of a multiprocessor system. As such, the mechanisms of the illustrative embodiments may be applied to any multiprocessor system that has modules that are duplicates of one another, i.e. modules that have the same configuration, barring any manufacturing discrepancies. Fault detection is performed using fault detection by duplication on internal signals of these modules and on-chip logic for performing comparisons and analysis of the results of such comparisons.

One multiprocessor system in which the mechanisms of the illustrative embodiments may be implemented is the Cell Broadband Engine (CBE) available from International Business Machines, Inc. The CBE is a multi-core processor comprising a control processor and multiple identical copies of co-processors, barring any manufacturing discrepancies. These co-processors are referred to as Synergistic Processing Elements (SPEs). With particular importance to the illustrative embodiments, in the CBE, corresponding internal signals of each of the SPEs are traced and connected to a trace/debug bus. A multiplexer in the SPEs selects the signals that are to be transmitted out of the SPE and into the trace/debug bus at any particular instance of time. These signals are connected to the trace/debug bus through OR gates. The trace/debug bus transmits this information obtained from trace signals to a trace logic analyzer (TLA) which in turn is capable of performing selected logic functions on the received signals.

It should be noted that while the illustrative embodiments will be described hereafter in terms of the CBE architecture, the present invention is not limited to use only with the CBE architecture. To the contrary, the mechanisms of the illustrative embodiments may be used with any multiprocessor system having duplicate modules that may be tested using the mechanisms of the illustrative embodiments. Moreover, the modules that are tested using the mechanisms of the illustrative embodiments need not be co-processors, as set forth in the CBE architecture based embodiments hereafter. Rather, any module having one or more duplicate modules in an integrated circuit chip may be tested using the mechanisms of the illustrative embodiments. For purpose of illustration, however, reference will now be made to the CBE architecture in which preferred embodiments are implemented.

Figure 1:
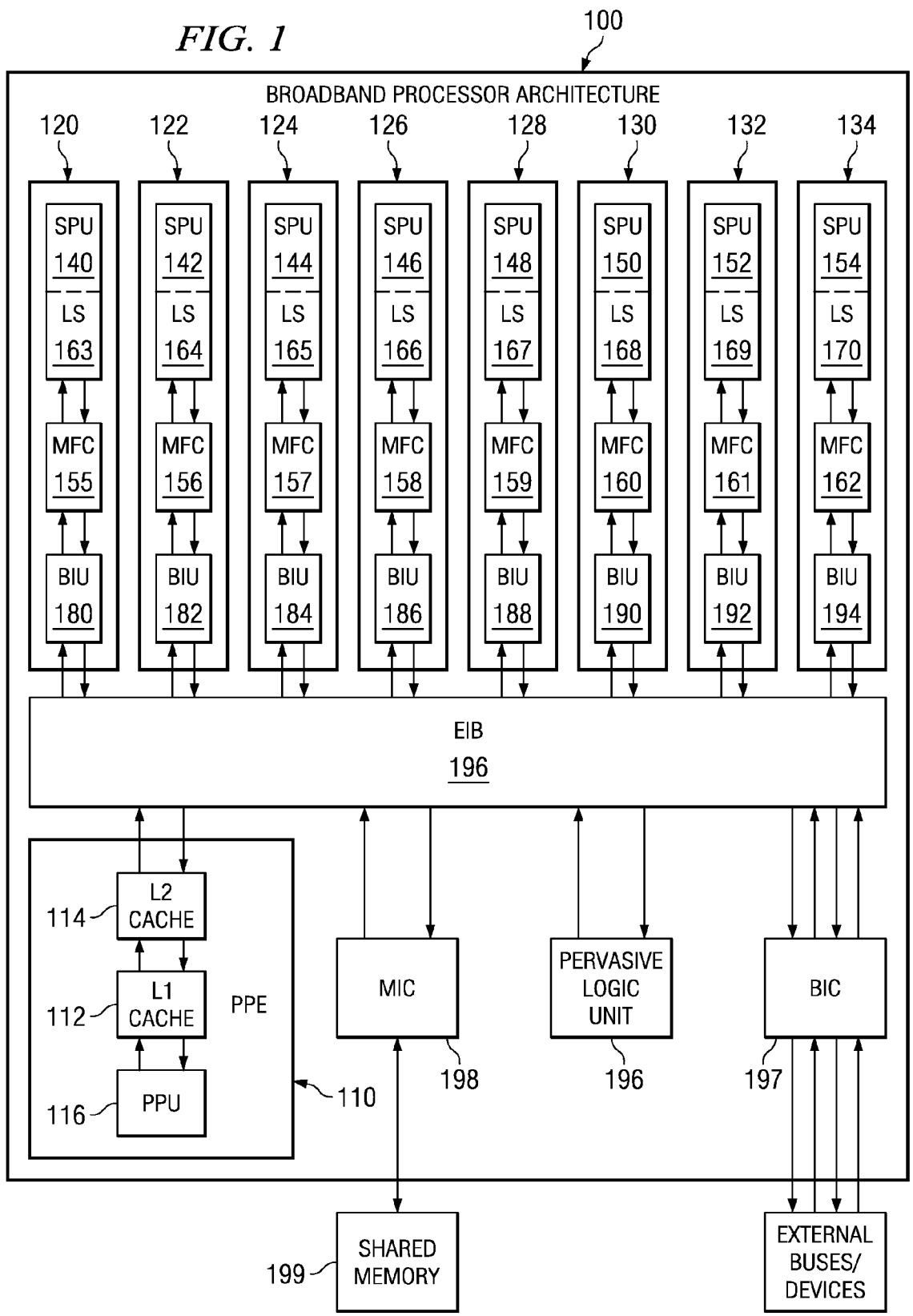
FIG. 1 is an exemplary block diagram of a multiprocessor system in which the exemplary aspects of the illustrative embodiments may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

In addition to the above, the CBE 100 includes a pervasive logic unit 196 that, among other things, includes a trace logic analyzer (TLA) (shown in FIG. 2, hereafter) for performing test, debug, and failure operations based on test outputs from the various elements of the CBE 100, e.g., SPEs 120-134. The TLA is an element that allows for debug and analysis of various elements of the CBE 100, e.g., the various components of the SPEs 120-134, by providing a window to internal signals of these elements. The TLA is responsible for debugging at initial chip bring-up operation, tracing of internal sequences, analysis of software alternatives or problems, analysis of potential hardware problems, and triage of unusual behavior. The main components of the TLA are match logic, state control logic and a trace array. The TLA operates based on information signals passed along a trace/debug bus (shown in FIG. 2, hereafter).

Figure 2:
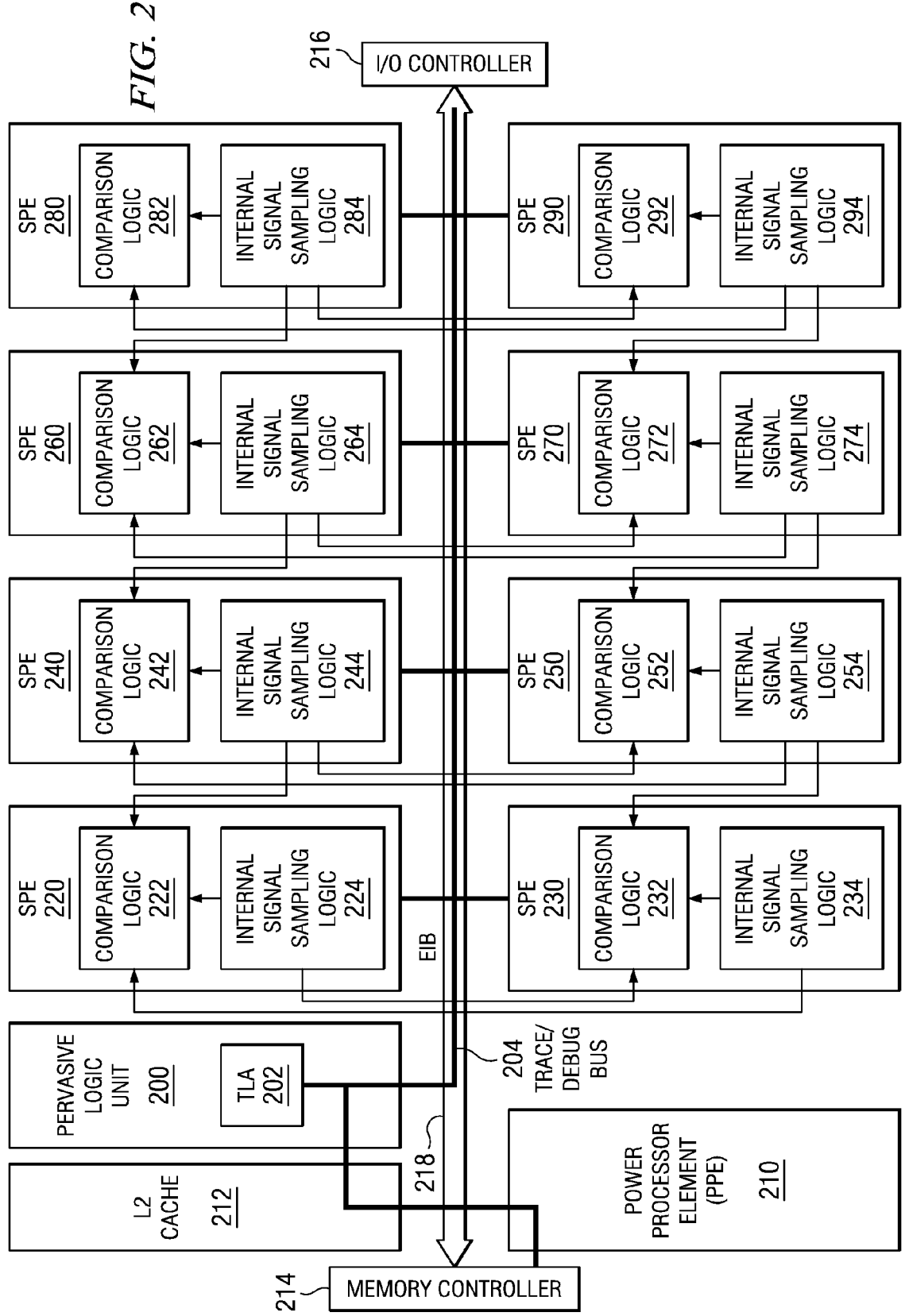
FIG. 2 is an exemplary block diagram illustrating a debug bus and trace logic analyzer in accordance with one illustrative embodiment.

The various elements of the CBE 100 may include circuitry and logic for testing the internal signals of these elements and provide test results to the TLA of the pervasive logic unit 196 via the test/debug bus (shown in FIG. 2, hereafter). The logic for testing the internal signals of these elements further includes logic for comparing the internal signals of one element with the internal signals of another element having a same configuration, e.g., comparing the internal signals of SPE 120 with SPE 122, for example. The results of such comparison of internal signals may be sent to the TLA in the pervasive logic unit 196 so that the TLA may perform debug and failure analysis and perform appropriate actions when a failure is detected. The TLA itself may provide signals off-chip to external testing equipment that may perform more detailed analysis. Alternatively, logic may be provided on the TLA to perform such detailed analysis to thereby identify a particular faulty element and determine corrective action for the faulty element.

It should be noted that the use of the term "internal signals" with regard to the present description refers to signals that are generated and, during normal operation, are utilized within an element, e.g., within an SPE 120-134, to perform various functions. These "internal signals" may be used to generate test results that are sent "externally," i.e. outside the element that is being tested, to the TLA via the test/debug bus. However, normally, the "internal signals" are not sent outside of the element being tested and are only utilized within the element itself.

In operation, identical test patterns are loaded into the SPEs 120-134 as inputs to these elements along with an indication of the internal signals to be compared. Logic within the SPEs 120-134 samples the internal signals of the SPEs 120-134 for comparison. The comparison may be performed by logic provided within the SPEs 120-134 which is coupled to the trace/debug bus. The results of such comparisons may be placed on the trace/debug bus and thereby provided to the TLA in the pervasive logic unit 196. The TLA may then determine, based on the results of such comparisons, whether the chip is faulty. Based on this decision indicating a fault, the TLA may output an appropriate signal to external equipment to notify a human user of the faulty chip, perform a hot-swap operation with a redundant SPE provided on the chip, or other fault related operation. In some illustrative embodiments, the TLA may simply output a signal to external equipment providing details regarding the detection of a fault with the external equipment actually performing the analysis to determine which SPE caused the fault and thus, which SPE to swap out for a redundant SPE. In other illustrative embodiments, the TLA is provided with on-chip logic for identifying the faulty SPE and which SPE to swap out for a redundant SPE.

The comparison described above may involve comparing internal signals of pairs of SPEs 120-134 on-chip to determine if there are any discrepancies between these internal signals. The basic assumption is that elements that are identical duplicates of each other, given the same stimulus, i.e. inputs, should generate the same internal signals. Thus, if there is a discrepancy in the internal signals monitored by the logic within the SPEs 120-134, then one of the elements is faulty, either due to manufacturing defects or other factors. Thus, from an initial comparison, it can be determined whether the chip is faulty or not. If a fault is detected in this manner, the chip may be discarded as faulty.

For debug and failure analysis, multiple pairs of SPEs 120-134 may be tested in the manner described above in order to pinpoint which SPE is the source of a fault. One of the SPEs 120-134 in a second pair of SPEs 120-134 should be in both the first pair and second pair of SPEs 120-134. Thus, each SPE 120-134 should appear in at least two pairs of SPEs 120-134 that are being compared and may appear in more than two pairs of SPEs 120-134 depending upon the implementation.

For example, a first pair of SPEs may include SPE 120 and SPE 122. A second pair of SPEs may include SPE 120 and SPE 124. Similarly, SPE 122 may be both in the first pair of SPEs and a third pair of SPEs comprising SPE 122 and SPE 126. In such a situation, if a fault is detected by the comparison of the internal signals of SPE 120 with SPE 122, and a fault is detected by the comparison of internal signals of SPE 120 with SPE 124, and the comparison of SPE 122 with SPE 126 in the third pair does not indicate a fault, then it can be determined that the fault must lie in SPE 120. Such decisions may be made by external testing equipment based on output signals from the TLA, for example. In an illustrative embodiment, logic may be provided on the TLA itself for performing such decisions based on the results obtained from the comparisons. In this way, the source of a fault may be debugged for use in determining how to perform fault operations, such as hot-swapping, for example.

FIG. 2 is an exemplary block diagram illustrating a debug bus and trace logic analyzer in accordance with one illustrative embodiment. As shown in FIG. 2, a trace/debug bus 204 is provided for communicating trace and debug signals between the SPEs 220-290, memory controller 214, input/output (IO) controller 216, power processor element 210, L2 cache 212, and the trace logic analyzer (TLA) 202 of the pervasive logic unit 200. The TLA 202 may perform tests and debugging with regard to the elements 210-216 and 220-290 as is generally known in the art. In addition, the TLA 202 may perform test, debug, and failure analysis in accordance with the illustrative embodiments as described previously above.

In other words, the mechanisms of the illustrative embodiments may make use of the existing hardware of a Cell Broadband Engine (CBE) architecture as a basis for performing the operations of the illustrative embodiments. The illustrative embodiments use comparison logic 222, 232, 242, 252, 262, 272, 282, 292, and logic in the TLA 202 for performing test, debug and failure analysis using a fault detection by duplication approach on the SPEs 220-290.

In operation, an automatic test pattern generator in the SPEs 220-290, the TLA 202, or the like, provides an appropriate test signal pattern to at least two of the SPEs 220-290. Alternatively, external test equipment may provide the test patterns to the SPEs 220-290. Moreover, the external test equipment or the TLA 202 provides to the SPEs 220-290 an identifier of the signals that it wishes to compare for purposes of fault detection. At least two SPEs 220-290 operate on the input test signal pattern and generate internal signals based on the processing of this test signal pattern. These internal signals are sampled by the internal signal sampling logic of the SPEs 220-290, e.g., internal signal sampling logic 224, in accordance with the identifier of the signals to be compared provided by the TLA 202.

The sampled signals for a pair of SPEs are provided to the comparison logic of the SPEs 220-290, e.g., comparison logic 222. For example, the sampled internal signals of SPE 220 are provided by internal signal sampling logic 224 to both the comparison logic 222 of SPE 220 and to comparison logic 232 of SPE 230. Similarly, the sampled internal signals of SPE 230 are provided by the internal signal sampling logic 224 to both the comparison logic 232 of SPE 230 and the comparison logic 222 of SPE 220. The internal signals from each of the SPEs 220 and 230 may then be compared using the respective comparison logic 222 and 232 of the SPEs 220 and 230.

The output from this comparison logic 222 and 232 indicates whether there is a discrepancy between the internal signals from SPE 220 and SPE 230. Again, as mentioned previously, since the SPEs 220 and 230 are supposed to be identical copies or duplicates of each other, and each SPE 220 and 230 receives the same input signal pattern, the internal signals sampled by the internal signal sampling logic 224 and 234 should be identical if both SPEs 220 and 230 are operating properly. If one or both of the SPEs 220 and 230 are operating improperly, then a discrepancy between the sampled internal signals for these SPEs 220 and 230 will be detected during the comparison.

The outputs generated by the comparison logic 222 and 232 are provided to the TLA 202 via the trace/debug bus 204. The TLA 202 receives these outputs and determines, by way of its own internal logic, whether the outputs from the comparison logic 222 and 232 indicate a fault was detected. If a fault is detected, the TLA 202 may generate a signal that is output off-chip to external equipment for notifying a human or other equipment that the chip is faulty and should be discarded.

It should be noted that while the above embodiment illustrates two SPEs that are opposite each other with respect to the trace/debug bus 204 being compared, the illustrative embodiments are not limited to such. Rather, comparisons may be made between any two SPEs 220-290. For example, the internal signals of SPE 230 may be compared with the same internal signals of SPE 250. Similarly, the internal signals of SPE 220 may be compared with the same internal signals from SPE 240. Moreover, with proper signal lines being provided, the internal signals of SPE 230 may be compared to the same internal signals of SPE 280. In short, with proper signal lines running between the SPEs 220-290, the internal signals of any two SPEs 220-290 may be compared.

FIG. 2 illustrates one exemplary embodiment for coupling SPEs 220-290 so as to provide comparisons of internal signals in pairs of SPEs 220-290. In this one exemplary embodiment, comparisons may be made between adjacent SPEs, such as SPE 230 and SPE 250, and SPEs that are directly across from each other with respect to the trace/debug bus 204, such as SPE 230 and SPE 220. It should be appreciated that this arrangement is selected for purposes of ease of manufacture and minimizing signal line lengths. However, this is not a limitation on the particular implementations of the present invention and any coupling of pairs of SPEs 220-290 may be used without departing from the spirit and scope of the present invention.

Thus, by comparing two SPEs 220-290, it can be determined whether the chip as a whole has a faulty element. Each pair of SPEs 220-290 may be compared so as to determine if there is any fault in any of the SPEs 220-290. While this is sufficient for most applications of the illustrative embodiments, it may be desirable in some applications to be able to pinpoint which SPE in the multiple SPEs 220-290 is faulty, i.e. which SPE is the source of the fault. The illustrative embodiments provide a mechanism for identifying the source element of a fault.

In an alternative embodiment, in order to identify a source of a fault, a plurality of pairs of SPEs 220-290 may be compared to thereby identify the particular SPE 220-290 that is the source of a fault. As described above, the depicted illustrative embodiment in FIG. 2 shows that both the SPEs that are across from each other with respect to the trace/debug bus 204 as well as the SPEs that are adjacent to each other are coupled by signal lines from their respective internal signal sampling logic to their respective comparison logic. Thus, the same SPE may be in two different pairs of SPEs for comparison purposes.

For example, the comparison logic 232 for SPE 230 receives sampled internal signals from internal signal sampling logic 224 of SPE 220, signal sampling logic 234 of SPE 230, and signal sampling logic 254 of SPE 250. Thus, SPE 230 is in a first pair of SPEs comprising SPEs 220 and 230 and a second pair of SPEs comprising SPEs 230 and 250. If the comparisons of internal signals in both the first pair and second pair of SPEs result in a fault being detected, i.e. a discrepancy between the sampled internal signals, then it can be reasonably assumed that the common SPE 230 is the source of the fault.

In order to make sure that the SPE 230 is the source of the fault, similar comparisons may be made with regard to SPEs 220 and 240, SPEs 250 and 240, and SPEs 250 and 270 to determine if any of the SPEs may be the source of the fault. If, through such comparisons, SPE 250 is determined to not be faulty and SPE 220 is also determined to not be faulty, then it can be determined that SPE 230 is indeed the faulty SPE.

In one illustrative embodiment, these determinations are made by external testing equipment based on off-chip outputs from the TLA 202. In an alternative illustrative embodiment, the TLA 202 itself is provided with logic to perform these determinations based on the output signals received from the comparison logic of the various SPEs 220-290. The simplest way for the external testing equipment or TLA 202 to determine the faulty SPE is to control each pair of SPEs to run separately from all the other SPEs, e.g., first running SPE0 and SPE1 with all other SPEs inactive, then running SPE1 and SPE2 with all other SPEs inactive, etc. The results of these runs may be stored, such as in a trace array of the TLA 202, and simple logic may be used, in either the external testing equipment or the TLA 202, to analyze the results of the various runs to deduce which SPEs were part of multiple failures.

Based on the determination of which SPE is faulty, the external test equipment or the TLA 202 may perform operations for identifying the faulty SPE, notify a human operator, and/or perform other fault related operations. For example, if the chip is provided with a redundant or spare element, e.g., spare SPE, the external testing equipment or TLA 202 may perform the necessary operations, such as setting appropriate bits in configuration registers, and the like, for disabling the faulty SPE and enabling the spare SPE. In this way, the TLA may hot-swap the spare SPE for the faulty SPE.

Thus, the mechanisms of the illustrative embodiments may be used to identify faults in modules, such as SPEs, of an integrated circuit chip by performing a fault detection through duplication methodology using on-chip logic that tests internal signals of modules that are intended to be identical. The mechanisms of the illustrative embodiment provide significant advantages over the approach described in Prasad, "Fault Tolerant Digital Systems," IEEE Potentials, vol. 8, no. 1, pp. 17-21, February 1989 (referenced above) in that a large number of internal signals may be compared rather than only outputs of the elements. The benefit of comparing internal signals as opposed to external signals as described in Prasad, is that usually the external signals are few and far away, logically, from the important functional units of the device. This makes it more difficult to actually activate a failure somewhere inside the chip and have it propagate to the output of the chip where it would be visible. As an example consider a normal processor which interfaces to the pins through a memory controller. If the actual core of the processor has a defect in the addition unit, for example, not only would the addition instruction have to be performed, but a memory instruction would also need to be performed to make the fail visible at the pins of the chip. To the contrary, if internal signals are able to be compared, as in the illustrative embodiments, in the above example the register bus may be monitored and a discrepancy indicating a failure may be identified without requiring the extra memory instruction execution, for example.

Moreover, the logic for performing comparisons and analysis based on results of comparisons may be provided in off-chip external testing equipment or on-chip in the TLA 202. By providing the logic on-chip rather than requiring external test equipment for performing comparisons and analysis, the cost of testing may be reduced by using lower cost on-chip logic than the more expensive external test equipment. Furthermore, the overhead of on-chip comparison of internal signals is very low since it only requires a minimal amount of logic to be added to the integrated circuit chip while using an existing trace/debug bus.

FIGS. 3A and 3B provide an exemplary circuit diagram in accordance with one illustrative embodiment. As is depicted in FIGS. 3A and 3B, the illustrative embodiments provide an XOR gate, e.g., XOR gates 314, 316, 320 and 326, just prior to the existing OR gate 319, 329 used to place trace data on the trace/debug bus 350. These XOR gates are used to perform comparisons of sampled internal signals between pairs of SPEs so as to permit the TLA 370 of the pervasive logic unit 360 to determine whether a faulty SPE is present on the integrated circuit chip. Moreover, by comparing more than one pair of SPEs, the TLA 370 may identify which SPE is the source of a detected fault and perform appropriate fault related operations.

As shown in FIGS. 3A and 3B, each SPE0-SPE7 is provided with logic for selecting internal signals for sampling and logic for comparing these internal signals between pairs of SPEs. Taking SPE0 and SPE1 as representative of the other pairs of SPEs which have identical logic arrangements as shown, the SPE1 includes one or more multiplexers 310 and 312 for selecting internal signals within the SPE1 for use in comparing with sampled internal signals of another SPE, e.g., SPE0. As shown in FIGS. 3A and 3B, the multiplexer 310 selects an internal signal which is then provided to the XOR gate 320 of SPE0 for comparison with a similarly selected internal signal in SPE0. The multiplexer 322 in SPE0 selects the same internal signals as selected by the multiplexer 310 in SPE1. As a result, the comparison performed by the XOR gate 320 compares the same internal signal of SPE0 and SPE1 to determine if there is any discrepancy between these sampled internal signals, e.g., one internal signal being at a high state while the other is at a low state. If there is a discrepancy, then the XOR gate 320 will output a signal that has a high state. The XOR gate 320 only outputs a high state signal when there is a discrepancy between the inputs, i.e. the sampled internal signals from multiplexers 310 and 322.

The output of the XOR gate 320 is provided to an OR gate 329 for placing comparison results on the trace/debug bus 350. As shown in FIGS. 3A and 3B, the OR gate 329 receives a number of inputs. A first input is from XOR gate 326 which XOR's the selected internal signal from multiplexer 322, based on the delay logic 328, with the output from an adjacent SPE, e.g., SPE2. In other words, this path is used to detect discrepancies between SPE0 and one of the other SPEs to the right of SPE0 in FIGS. 3A and 3B. Delay logic 328 is used to synchronize the data coming from the SPEs to the right of SPE0 so that the same functional cycle for both SPE0 and the SPE to the right of SPE0 are compared.

A second input to the OR gate 329 is the selected internal signal from the multiplexer 310 in SPE1 which is used to allow normal tracing features. The third input to the OR gate 329 is the output of the XOR gate 320 described previously. The fourth input into the OR Gate is for normal tracing functions. The fifth input to the OR gate 329 is the output signal from an adjacent SPE, e.g., SPE2.

In summary, the first input to the OR gate 329 provides a comparison path between the current SPE and an adjacent SPE to the right in FIGS. 3A and 3B. The second input to the OR gate 329 provides a cross-over path for normal tracing and allows each SPE to trace twice as much by setting each internal signal multiplexer differently. The third input to the OR gate 329 is a comparison path for the current SPE with an adjacent SPE across from the current SPE, e.g., SPE1, or potentially any SPE to the right of the current SPE. The fourth input to the OR gate 329 provides a normal tracing path for the current SPE. The fifth input to the OR gate provides a pass through tracing path to allow trace data or the newly added comparison data to make its way to the TLA.

Thus, with these inputs to the OR gate 329, if any of the input signals used for detecting differences, i.e. the result of comparing the internal signals of an adjacent SPE, e.g., SPE2, with SPE0, or the result of comparing the internal signals of SPEs across from on another, e.g., SPE1, with SPE0, or the output of the OR gate from adjacent SPE, e.g., SPE2, is high, then the OR gate 329 outputs a high output indicative of a fault.

Each of SPE0-SPE7 has the same arrangement of circuitry as described above with regard to SPE0 and SPE1. Thus, two interrelated chains of SPEs are provided, an upper chain and lower chain of SPEs. In the upper chain of SPEs, the output of SPE6 is provided to SPE4, whose output is provided to SPE2. The output of SPE2 is provided to SPE0 whose output is placed on trace/debug bus 350. Similarly, in the lower chain of SPEs, the output of SPE7 is provided to SPE5, whose output is provided to SPE3. The output of SPE3 is provided to SPE1 whose output is placed on trace/debug bus 350. Thus, SPEs are coupled to their adjacent SPEs in the same chain as well as corresponding SPEs directly opposite them in the array arrangement of SPEs.

Using this circuitry arrangement, identical test patterns are applied to all of the SPEs 0-7 and the response from designated pairs of SPEs are compared. In the depicted example, two SPEs at a time are compared, although it is feasible that more than two SPEs may be compared with minor modifications of the circuitry arrangement shown in FIGS. 3A and 3B. In particular, in the depicted example, SPE0 and SPE1 are compared, SPE2 and SPE3 are compared, SPE4 and SPE5 are compared, and SPE6 and SPE7 are compared. The resulting value obtain from these comparisons is a 128 bit signal with 64 bits coming from an upper SPE (SPE 0, 2, 4, or 6) and the other 64 bits coming from a corresponding lower SPE (SPE 1, 3, 5, or 7). The result values are ramped onto the trace/debug bus 350 through the existing OR gates and transmitted to the TLA 370.

In the TLA 370, the result value is compared with a 128 bit wide all 0 vector and, if a mismatch is identified, then the chip is determined to be faulty. The reason behind this determination based on a mismatch is that if the particular pair of SPEs being compared are fault free, then their corresponding internal signals will have the same logic value. Thus, when these signals are compared using the XOR gate 314 or 320, the output of the XOR gate should have a logic 0 value. If it does not, it implies that one of the two signals is faulty. Thus, all 128 bits coming out of any such comparison using XOR gates should have a logic 0 value if both the SPEs are fault free.

Thus, the circuitry shown in FIGS. 3A and 3B may be used to detect a faulty SPE in the integrated circuit chip. The identification of this fault by the TLA 370 may be used as a basis for discarding the chip as faulty or performing other fault related operations. In addition to simply detecting whether the chip is faulty, the circuitry shown in FIGS. 3A and 3B may also be used to pinpoint which SPE 0-7 is the cause of the fault. In order to do this, a debug and failure analysis methodology may be employed in external test equipment or within logic of the TLA 370.

The debug and failure analysis methodology requires that the same test pattern/stimulus be applied to all of the SPEs 0-7 and the corresponding internal signals of these SPEs being traced in a manner similar to that described above. However, in addition to comparing internal signals of an upper SPE with the same internal signal of a corresponding lower SPE, adjacent SPEs are compared, e.g., SPE0 is compared with SPE2, SPE1 is compared with SPE3, SPE4 is compared with SPE6, and SPE5 is compared with SPE7. This is made possible since the circuitry shown in FIGS. 3A and 3B, as discussed previously, permits the upper and lower SPEs to receive traced signals not only from their corresponding upper or lower SPE, but also from their adjacent SPEs. The XOR gates 316 and 326 are provided prior to the OR gates 319 and 329 to perform the comparison between adjacent SPEs.

In the debug and failure analysis methodology, the 128 bit result containing the response of a pair wise comparison, such as an upper and lower SPE, is sent to the TLA 370 and compared with a 128 bit all 0 vector in the same manner as in the above described test methodology. However, if there is a mismatch detected, then the indication whether there is a failing SPE in this particular pair of SPEs may be stored, such as in a trace array, in the TLA 370. Subsequently, both the SPEs in this pair are compared with their adjacent SPEs. If there is a failure indicated in either one of these comparisons, then the common SPE among the pair (adjacent SPE pair) and the earlier pair (upper and lower SPE pair) is the failing SPE. Alternatively, such determinations may be made by external testing equipment based on the results of these various comparisons.

For example, if there is a failure indicated for the pair SPE0 and SPE1, then this information, i.e. that the pair failed, is stored in the TLA 370. Subsequently, the pair SPE0 and SPE2, as well as the pair SPE1 and SPE3 are compared and the results of these comparisons are analyzed by the TLA 370. If a failure is indicated in the pair SPE0 and SPE2, then it can be inferred that SPE0 is the failing SPE. Otherwise, if a failure is indicated in the pair SPE1 and SPE3, then it can be inferred that SPE1 is the failing SPE.

FIG. 4 is a flowchart outlining an exemplary operation for performing failure analysis of a module on a multiprocessor integrated circuit chip in accordance with one illustrative embodiment. The operation shown in FIG. 4 may be performed, for example, using the integrated circuit chip arrangement shown in FIGS. 2-3 above. It should be appreciated that while FIG. 4 will be described in terms of an operation for detecting faulty SPEs, the present invention is not limited to such. Rather, a similar operation may be used to detect faulty modules of any type so long as there are at least two modules that are designed and fabricated with the intent that these modules be exact copies or duplicates of each other.

As shown in FIG. 4, the operation starts with the TLA providing a test signal pattern to the SPEs and an indication of the internal signals that are to be sampled (step 410). The SPEs operate on the test signal pattern to generate internal signals (step 420) that are sampled by internal signal sampling logic provided in the SPEs (step 430). The same internal signals of pairs of corresponding SPEs in different SPE chains are compared using comparison logic provided in the SPEs (step 440). Results of these comparisons are sent to an on-chip trace logic analyzer (step 450). The on-chip trace logic analyzer analyzes the results of the comparisons (step 460) to determine if there are any faulty SPEs (step 470).

If there is a faulty SPE, the trace logic analyzer may output an indication of the fault externally from the chip (step 480) and the fault indication may be stored in the trace logic analyzer (step 490). Optionally, internal signals of adjacent pairs of SPEs may be compared in a similar manner (step 500). Based on the outputs from these comparisons, the trace logic analyzer may determine whether there is any fault detected in other pairs of SPEs that include one of the SPEs in the original pair in which the fault was detected (step 510). If so, then the trace logic analyzer may identify the common SPE as the source of the fault (step 520). The trace logic analyzer may then perform appropriate fault related operations based on the identification of the faulty SPE (step 530). Such operations may include, for example, performing a hot-swap operation with a redundant or spare SPE provided on-chip. The operation then terminates.

Thus, the illustrative embodiments provide a mechanism for accelerating the test, debug, and failure analysis of an integrated circuit chip. In particular, the illustrative embodiments may be used to detect faults with regard to any duplicate modules of an integrated circuit chip, including processors on a multiprocessor system-on-a-chip (SoC). Such a multiprocessor SoC may be a heterogeneous multiprocessor SoC, such as the Cell Broadband Engine. Because the comparison and analysis is performed on-chip, the detection and handling of faults may be accelerated and made more cost effective than known methodologies that require the use of external test equipment.

As mentioned above, the circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a multiprocessor integrated circuit device, for identifying a faulty module of the integrated circuit device, comprising:
    applying an input test pattern to a plurality of processors of the multiprocessor integrated circuit device, wherein the plurality of processors are copies of one another within a manufacturing tolerance;
    sampling, within the multiprocessor integrated circuit device, internal signals of at least two processors in the plurality of processors to generate sampled signals, wherein the internal signals are signals that are generated and utilized only within the at least two processors and are not output by the at least two processors during normal operation of the at least two processors;
    comparing, within at least one of the at least two processors, the sampled signals of the at least two processors to detect if there is any discrepancy between the internal signals of the at least two processors; and
    identifying the integrated circuit device as faulty if a discrepancy between the internal signals is detected by the comparison.

2. The method of claim 1, wherein sampling internal signals comprises sampling the internal signals using internal signal sampling logic built into each of the at least two processors in the plurality of processors, and wherein comparing the internal signals of the at least two processors comprises using comparison logic built into at least one of the at least two processors in the plurality of processors.

3. The method of claim 1, wherein identifying the multiprocessor integrated circuit device as faulty comprises:
    providing results of the comparison to a trace/debug bus of the multiprocessor integrated circuit device;
    transferring the results of the comparison to a trace logic analyzer provided on the multiprocessor integrated circuit device via the trace/debug bus; and
    analyzing, in the trace logic analyzer, the results of the comparison to determine if the multiprocessor integrated circuit device is faulty.

4. The method of claim 1, wherein comparing the sampled signals of the at least two processors comprises:
    comparing, in a first comparison, one or more sampled signals of a first processor with one or more sampled signals of a second processor; and
    comparing, in a second comparison, the one or more sampled signals of the first processor with one or more sampled signals of a third processor.

5. The method of claim 4, wherein the first processor and second processor are opposite each other with respect to a bus of the multiprocessor integrated circuit device, and wherein the first processor and third processor are adjacent to each other with respect to the bus of the multiprocessor integrated circuit device.

6. The method of claim 4, further comprising identifying which processor in the plurality of processors on the multiprocessor integrated circuit device is faulty based on results of the first comparison and second comparison.

7. The method of claim 6, wherein if results of the first comparison indicate a faulty processor and results of the second comparison indicate a faulty processor, then the first processor is identified as the faulty processor.

8. The method of claim 6, further comprising:
    performing a hot-swap operation to swap a spare processor for the faulty processor identified by the results of the first comparison and second comparison.

9. The method of claim 1, wherein:
    the comparing is performed by an XOR gate of the at least one processor of the at least two processors, and wherein the XOR gate is provided within the at least one processor just prior to an OR gate for placing result data on a trace/debug bus,
    the XOR gate receives a first sampled signal from another processor of the at least two processors and a second sampled signal from internal logic of the at least one processor selected from a plurality of sampled signals of the at least one processor by internal selection logic within the at least one processor, and
    the XOR gate provides a result of the comparison as an output to the OR gate for placing as result data on the trace/debug bus.

10. The method of claim 1, wherein the multiprocessor integrated circuit device is a heterogeneous multiprocessor system-on-a-chip having a control processor and a plurality of co-processors, and wherein the plurality of co-processors constitute the plurality of processors.

11. An apparatus, comprising:
a multiprocessor integrated circuit device having a plurality of processors, wherein the plurality of processors are copies of one another within a manufacturing tolerance;
internal signal sampling logic provided in each of the plurality of processors; and
comparison logic provided in each of the plurality of processors, wherein:
an input test pattern is applied to the plurality of processors of the multiprocessor integrated circuit device,
the internal signal sampling logic of at least two processors in the plurality of processors samples internal signals of the at least two processors to generate sampled signals, wherein the internal signals are signals that are generated and utilized only within the at least two processors and are not output by the at least two processors during normal operation of the at least two processors,
the comparison logic of at least one processor of the at least two processors compares the sampled signals of the at least two processors to detect if there is any discrepancy between the internal signals, and
the multiprocessor integrated circuit device is identified as faulty if a discrepancy between the internal signals is detected by the comparison logic of the at least one processor.

12. The apparatus of claim 11, wherein the comparison logic of a first processor comprises an exclusive OR gate that compares an output of a sampled signal of an adjacent second processor with an internal signal of the first processor.

13. The apparatus of claim 11, further comprising:
a trace/debug bus coupled to the plurality of processors; and
a trace logic analyzer coupled to the trace/debug bus, wherein the multiprocessor integrated circuit device is identified as faulty by:
providing results of the comparison to the trace/debug bus;
transferring the results of the comparison to the trace logic analyzer via the trace/debug bus; and
analyzing, in the trace logic analyzer, the results of the comparison to determine if the multiprocessor integrated circuit device is faulty.

14. The apparatus of claim 11, wherein the sampled signals of the at least two processors are compared by:

comparing, in a first comparison, one or more sampled signals of a first processor with one or more sampled signals of a second processor; and
comparing, in a second comparison, the one or more sampled signals of the first processor with one or more sampled signals of a third processor.

15. The apparatus of claim 14, wherein the first processor and second processor are opposite each other with respect to a bus of the apparatus, and wherein the first processor and third processor are adjacent to each other with respect to the bus of the apparatus.

16. The apparatus of claim 14, wherein one of a trace logic analyzer or external testing equipment identifies which processor in the plurality of processors of the apparatus is faulty based on results of the first comparison and second comparison.

17. The apparatus of claim 16, wherein if results of the first comparison indicate a faulty processor and results of the second comparison indicate a faulty processor, then the first processor is identified as the faulty processor.

18. The apparatus of claim 16, wherein one of the trace logic analyzer or the external testing equipment initiates a hot-swap operation to swap a spare processor for the faulty processor identified by the results of the first comparison and second comparison.

19. The apparatus of claim 11, wherein:
the comparison logic in each processor comprises an XOR gate provided within the processor just prior to an OR gate for placing result data on a trace/debug bus of the apparatus,
the XOR gate of a current processor receives a first sampled signal from another processor in the plurality of processors and a second sampled signal from internal logic of the current processor selected from a plurality of sampled signals of the current processor by internal selection logic within the current processor, and
the XOR gate of the current processor provides a result of the comparison as an output to the OR gate of the current processor for placing as result data on a trace/debug bus of the current processor.

20. The apparatus of claim 11, wherein the multiprocessor integrated circuit device is a heterogeneous multiprocessor system-on-a-chip having a control processor and a plurality of co-processors, and wherein the plurality of co-processors constitute the plurality of processors.

* * * * *